(12) United States Patent
Vakil et al.

(10) Patent No.: US 6,173,563 B1
(45) Date of Patent: Jan. 16, 2001

(54) MODIFIED BOTTOMING CYCLE FOR COOLING INLET AIR TO A GAS TURBINE COMBINED CYCLE PLANT

(75) Inventors: Himanshu Bachubhai Vakil, Schenectady; Anthony John Dean, Scotia; Jatila Ranasinghe, Niskayuna, all of NY (US)

(73) Assignee: General Electric Company, Schenectady, NY (US)

(*) Notice: Under 35 U.S.C. 154(b), the term of this patent shall be extended for 0 days.

(21) Appl. No.: 09/114,205

(22) Filed: Jul. 13, 1998

(51) Int. Cl.[7] .................................................. F02C 6/00
(52) U.S. Cl. .................. 60/39.04; 60/39.182; 60/728
(58) Field of Search ..................... 60/39.181, 39.187, 60/39.04, 728; 122/7 R, 7 B

(56) References Cited

U.S. PATENT DOCUMENTS

| | | |
|---|---|---|
| 4,346,561 | 8/1982 | Kalina . |
| 4,486,340 | 12/1984 | Glass, Jr. . |
| 4,489,563 | 12/1984 | Kalina . |
| 4,548,043 | 10/1985 | Kalina . |
| 4,604,867 | 8/1986 | Kalina . |
| 4,732,005 | 3/1988 | Kalina . |
| 4,763,480 | 8/1988 | Kalina . |
| 4,899,545 | 2/1990 | Kalina . |
| 4,982,568 | 1/1991 | Kalina . |
| 5,029,444 | 7/1991 | Kalina . |
| 5,095,708 | 3/1992 | Kalina . |
| 5,203,161 | * 4/1993 | Lehto .................................. 60/39.53 |
| 5,203,899 | 4/1993 | Kyota . |
| 5,428,950 | * 7/1995 | Tomlinson et al. ............... 60/39.182 |
| 5,577,377 | * 11/1996 | Tomlinson ......................... 60/39.182 |
| 5,623,822 | * 4/1997 | Schuetzenduebel et al. ...... 60/39.182 |
| 5,655,373 | * 8/1997 | Yamashita et al. .................... 60/728 |

\* cited by examiner

Primary Examiner—Charles G. Freay
(74) Attorney, Agent, or Firm—Noreen C. Johnson; Douglas E. Stoner

(57) ABSTRACT

A method for improving the overall power rating and thermodynamic efficiency of a steam and gas turbine combined cycle plant having a conventional heat recovery steam generator ("HRSG") as part of the bottoming cycle by cooling the inlet air to the gas turbine (particularly under circumstances when the ambient inlet air temperature to the gas turbine exceeds about 60° F.) using an external chiller subsystem. The preferred method includes the steps of initially heating a multi-component working fluid consisting of higher and lower boiling components (such as ammonia and water) by exposing the working fluid to the gas turbine combustion gases inside the HRSG, evaporating part of the working fluid to generate a vapor fraction enriched in the lower boiling point component, separating the enriched vapor fraction from the multi-component working fluid in a vapor-liquid separator, condensing the vapor into an enriched liquid, subcooling a portion of the enriched liquid, and then cooling the inlet air to the gas turbine through heat exchange with a portion of the subcooled and enriched liquid.

10 Claims, 5 Drawing Sheets

MODIFIED BOTTOMING CYCLE FOR COOLING INLET AIR TO A GAS TURBINE COMBINED CYCLE PLANT

BACKGROUND OF THE INVENTION

The present invention relates to a method for improving the power rating and efficiency of a steam and gas turbine ("STAG") combined cycle plant. In particular, the invention concerns a method for increasing the total output power of a combined cycle plant, with no degradation in thermal efficiency, by cooling the air inlet to the gas turbine using a multi-component working fluid (such as a mixture of ammonia and water) and a portion of the waste heat in the low pressure section of a heat recovery steam generator ("HRSG") in the bottoming cycle. As discussed herein, a "chiller" positioned outside the HRSG uses a multi-component working fluid to cool the air inlet to the gas turbine to thereby improve the total output power of the turbine particularly when the ambient air temperature of the feed to the gas turbine exceeds about 60° F.

"Combined cycle" power generation systems are well known in the art and typically include a gas turbine and a heat recovery steam generator that utilizes the heat from the gas turbine exhaust in order to generate high and intermediate pressure steam which in turn drives a steam turbine. The steam cycles used in conventional heat recovery steam generators vary considerably in design and operation. Typically, however, such systems use single-pressure or multiple-pressure heat recovery cycles (i.e., cycles that vary in steam pressure from high to low) with multiple heat recovery evaporators (boilers) to generate steam at the pressure levels necessary to drive different stages of the steam turbine.

The term "bottoming cycle" has long been used in the industry to describe the heat recovery steps which generate intermediate and low pressure steam for use in corresponding intermediate and low pressure stages of the steam turbine. In most combined cycle power plants, the inherent mismatch in thermal characteristics of the gas turbine exhaust (which releases sensible heat upon cooling in the HRSG) and the steam generator (which absorbs latent heat of boiling at a constant temperature) often results in thermodynamic losses in the range of about 10% of the work produced by the bottoming cycle.

A continuing need exists to improve the efficiency of conventional gas turbine combined cycle power plants. Thus, it has become common practice to utilize multiple pressure steam cycles to minimize the extent of the thermodynamic losses, particularly in the bottoming cycle. However, practical constraints limit the number of different pressures to three or less. With single pressure steam cycles, the thermodynamic losses can be higher than the 10% level. Even in multiple-pressure designs, considerable attention must be paid to optimizing the design of feed water preheaters, superheaters and reheater devices in order to minimize the potential efficiency losses.

The most common thermodynamic cycle for producing energy from a heat source in an HRSG is known as the "Rankine cycle." In a conventional Rankine cycle, a single working fluid (normally water) is evaporated using a readily available heat source and then expanded across one or more stages of the steam turbine, thereby transforming its energy into a more useable form for generating electricity. The "spent" working fluid vapor is then condensed in a condenser using an available cooling medium, such as cooling water. The potential energy of the condensed working fluid is increased by pumping it to a higher pressure and then re-heating the pressurized liquid in the HRSG to generate additional higher pressure steam as a new working fluid. Although the Rankine cycle works very effectively, it often suffers from efficiency losses due to the additional energy required to regenerate the steam, particularly in multiple-stage HRSG systems.

Another known problem in the operation of conventional combined gas/steam turbine cycles is that they experience reductions in total output power as compared to the rated value of the system when the air inlet temperature to the first stage gas turbine exceeds about 60° F. during, for example, the hottest months of the year. In the past, various attempts have been made to use mechanical refrigeration to reduce the temperature of the inlet air to the gas turbine. One obvious drawback to conventional refrigeration systems is that they ultimately reduce the efficiency of the overall process because of the power necessarily consumed by the refrigeration compressor and related equipment.

During the past ten years, various patents have issued describing the use of multi-component working fluids (such as ammonia and water) to improve the efficiency of conventional Rankine cycles by substituting the multi-component fluid for water in the heat recovery steam generation cycles. These new systems—known generally as "Exergy systems"—operate on the general principal that a binary (multi-component) working fluid can be pumped to a high working pressure and then heated to partially vaporize the working fluid. The mixture is then flashed under non-isothermal conditions to separate the high and low boiling working fluid compounds, with the low boiling component being expanded across a turbine to drive the turbine and generate additional electricity. The high boiling component contains recoverable heat for use in heating the binary working fluid to evaporation. Typically, the high boiling component is then mixed with the "spent" low boiling fluid to absorb the spent working fluid in a condenser in the presence of a cooling medium.

In certain instances, these known Exergy cycles using multi-component fluids have demonstrated improved efficiencies as compared to Rankine cycles when a relatively low temperature heat source is employed. Multi-component systems, however, tend to provide less theoretical and practical advantages over conventional cycles when higher temperature heat sources are involved. Some later-generation multi-component systems provide improved efficiencies by using a distillation step in which part of the working fluid is distilled to assist in regenerating the working fluid. In that regard, various systems (known generally as "Kalina cycles") have been proposed as modifications of the original concept of using a multi-component working fluid to improve the thermodynamic efficiencies of bottoming cycles. See., e.g., U.S. Pat. Nos. 4,346,561; 4,489,563; 4,548,043; 4,586,340; 4,604,867; 4,732,005; 4,763480; 4,899,545; 4,982,568; 5,029,444; 5,095,708 and 5,203,899. One clear disadvantage of the prior art Kalina-type systems is that the multi-component "working fluid" can cause significant increases in overall turbine cost due to the inherent corrosive potential of ammonia-water working fluids on turbine blades and other components used in the power generation cycles.

In addition, although the modified Kalina bottoming cycle designs tend to reduce the thermodynamic losses in the HSRG by using mixtures that undergo non-isothermal changes in state, such systems must carefully match the thermal characteristics of the working fluid to that of the gas turbine exhaust by using multiple reheats and/or by partitioning the two-phase heat load on the system. Thus, in the past, it has been very difficult to incorporate the potential efficiency advantages offered by a Kalina-type cycle into a conventional multi-pressure steam bottoming cycle. Significant practical difficulties also exist in combining a multi-component working fluid cycle into a single component system because of the inherent differences in process conditions and materials used to operate the two cycles in tandem.

Accordingly, there is a need to provide a modification to a conventional bottoming cycle by adding a separate, multi-component cycle which uses a portion of the bottoming cycle waste heat but operates external to the HRSG as a "chiller" to cool the inlet air to the gas turbine.

There is a further need to provide for an improved bottoming cycle that incorporates a multi-component working fluid in one section of the bottoming cycle to enhance the heat recovery and reduce thermodynamic losses in the bottoming cycle, while at the same time preserving the advantages of maintaining a steam working fluid to drive the HRSG steam turbine.

Yet a further need is to modify the low pressure section of an HRSG that heats the water before it enters the low pressure boiler (sometimes called the low pressure "economizer" section of the HRSG) by using a portion of the economizer waste heat to operate an ammonia/water cycle as described in greater detail below.

Still yet another need is to modify a conventional combined STAG cycle by incorporating an ammonia-water cycle to take advantage of the inherent thermal mismatch between the exhaust gases and the water through the use of a dual component working fluid, and thereby improve the overall performance rating of the bottoming cycle, particularly when the air temperature into the first stage gas turbine exceeds about 60° F. Lastly, there is a need to utilize an ammonia-water cycle to eliminate the need for supplemental cooling equipment (e.g., conventional mechanical refrigeration) in order to lower the ambient air inlet temperature to the first stage gas turbine.

SUMMARY OF THE INVENTION

This invention satisfies the above-stated needs by the finding that the overall efficiency of the bottoming cycle in a combined STAG cycle plant having multiple pressure stages can be significantly improved by incorporating a modified Exergy (Kalina-type) cycle (using ammonia and water as the working fluid) into the low pressure "economizer" section of the HRSG in the bottoming cycle. In particular, it has now been discovered that an ammonia-water cycle can be used effectively to cool the inlet air to the first stage gas turbine by taking advantage of certain heat recovery efficiencies in the low pressure section of the HRSG. The use of the "inlet air chiller" in accordance with the invention ultimately tends to improve the overall power rating for the gas turbine, particularly when the ambient air temperature feed to the turbine exceeds about 60° F.

In accordance with one aspect of the present invention, the modified bottoming cycle for inlet air chilling includes the following process steps:

(a) initially heating a multi-component working fluid consisting of higher and lower boiling components (preferably ammonia and water) inside the HRSG portion of the bottoming cycle by exposing the multi-component working fluid to a portion of the waste heat from the gas turbine exhaust;

(b) evaporating part of the multi-component working fluid to generate an enriched vapor fraction (i.e., enriched with the lower boiling point component relative to the working fluid);

(c) separating the enriched vapor fraction from the working fluid outside the HRSG using a vapor-liquid separator and condenser to condense the enriched vapor into an enriched liquid;

(d) subcooling a portion of the enriched liquid by reducing the pressure of the liquid; and (e) cooling the inlet air to the gas turbine through heat exchange using the subcooled and enriched liquid as the primary cooling medium.

Further objects, features and advantages of the subject invention will become apparent from the following detailed description of the preferred exemplary embodiment taken in conjunction with the appended drawings.

DETAILED DESCRIPTION OF THE DRAWINGS

Figure 1:
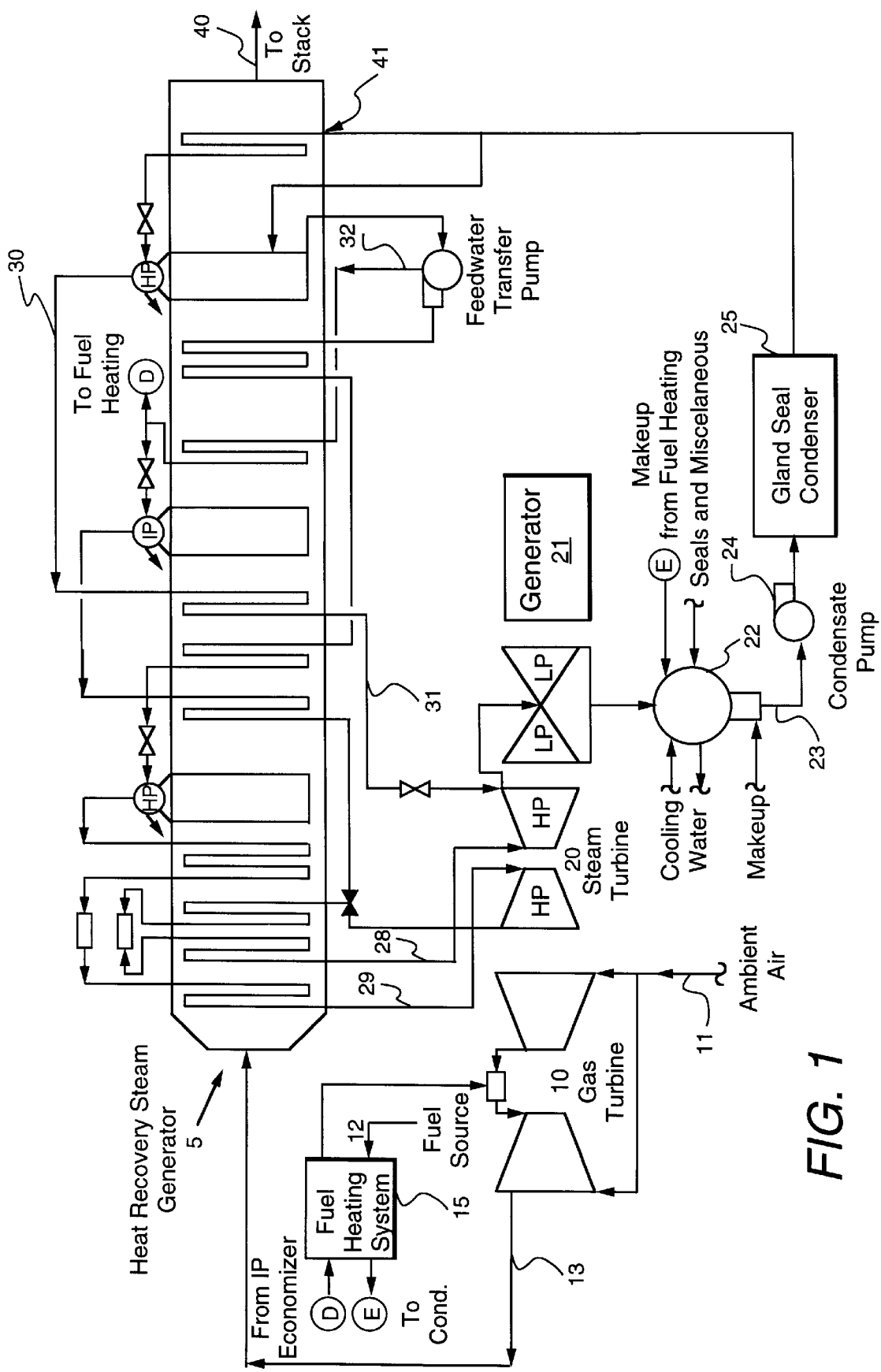
FIG. 1 of the drawings is a process flow diagram for a conventional bottoming cycle with an HRSG having three separate pressure zones (high, intermediate and low), but without the air inlet chiller design for improving the overall efficiency of the combined cycle in accordance with the present invention.

A typical schematic of a combined cycle plant using a conventional gas turbine generator 10 and bottoming cycle appears in FIG. 1 of the drawings. The bottoming cycle in FIG. 1 shows a well known combined cycle design with a conventional heat recovery steam generator section (HRSG) having three different operating pressures (high, intermediate and low) with means for generating steam at various pressures and temperatures as vapor feed to corresponding high pressure ("HP"), intermediate pressure ("IP") and low pressure ("LP") stages of steam turbine 20. As the steam vapor expands across each stage, turbine 20 drives generator 21, with the final "spent" vapor being removed and condensed in water-cooled condenser 22 for recycle as a condensate working fluid in line 22. Additional makeup water is added to the system upstream of a condensate pump 24 and a gland seal condenser 25. The liquid working fluid returns to the low pressure "economizer" section of the HRSG at two entry points via lines 26 and 27.

FIG. 1 also illustrates how gas turbine 10 uses an air feed (line 11) at ambient temperature and a fuel source 12 (preheated before ignition using fuel heating system 15) to generate hot combustion gases and drive the gas turbine. The high temperature exhaust 13 from the gas turbine feeds into the tri-pressure heat recovery steam generator (shown generally as item 5). The HRSG uses three conventional evaporators or "boilers" (identified as "HP," "IP" and "LP" in FIG. 1 for high, intermediate and low pressure, respectively) to generate steam used to drive steam turbine 20 and generator 21. In the conventional arrangement depicted in FIG. 1, "spent" high pressure steam from turbine 20 is reheated in the HRSG, with a first portion (line 28) being recycled back to the steam turbine at an intermediate pressure, and a second portion (line 29) being returned to the first stage of the steam turbine at a somewhat higher operating pressure and temperature.

The low pressure boiler (evaporator) ("LP") in the "economizer" section of the HRSG heats and evaporates a portion of the combined condensate and makeup working fluid recycle from condenser 22 via condensate pump 24 and gland seal condenser 25. Typically, the vapor from the LP evaporator passes back through the HRSG for additional heating (see line 30), and eventually becomes part of the feed to one or more intermediate pressure stages of steam turbine 20 (see line 31). In similar fashion, the intermediate pressure evaporator ("IP") in the HRSG reheats and vaporizes a portion of the fluid from the LP evaporator to a higher temperature and pressure (see line 32) for use as the working vapor for one or more intermediate pressure stages of turbine 20.

Figure 2:
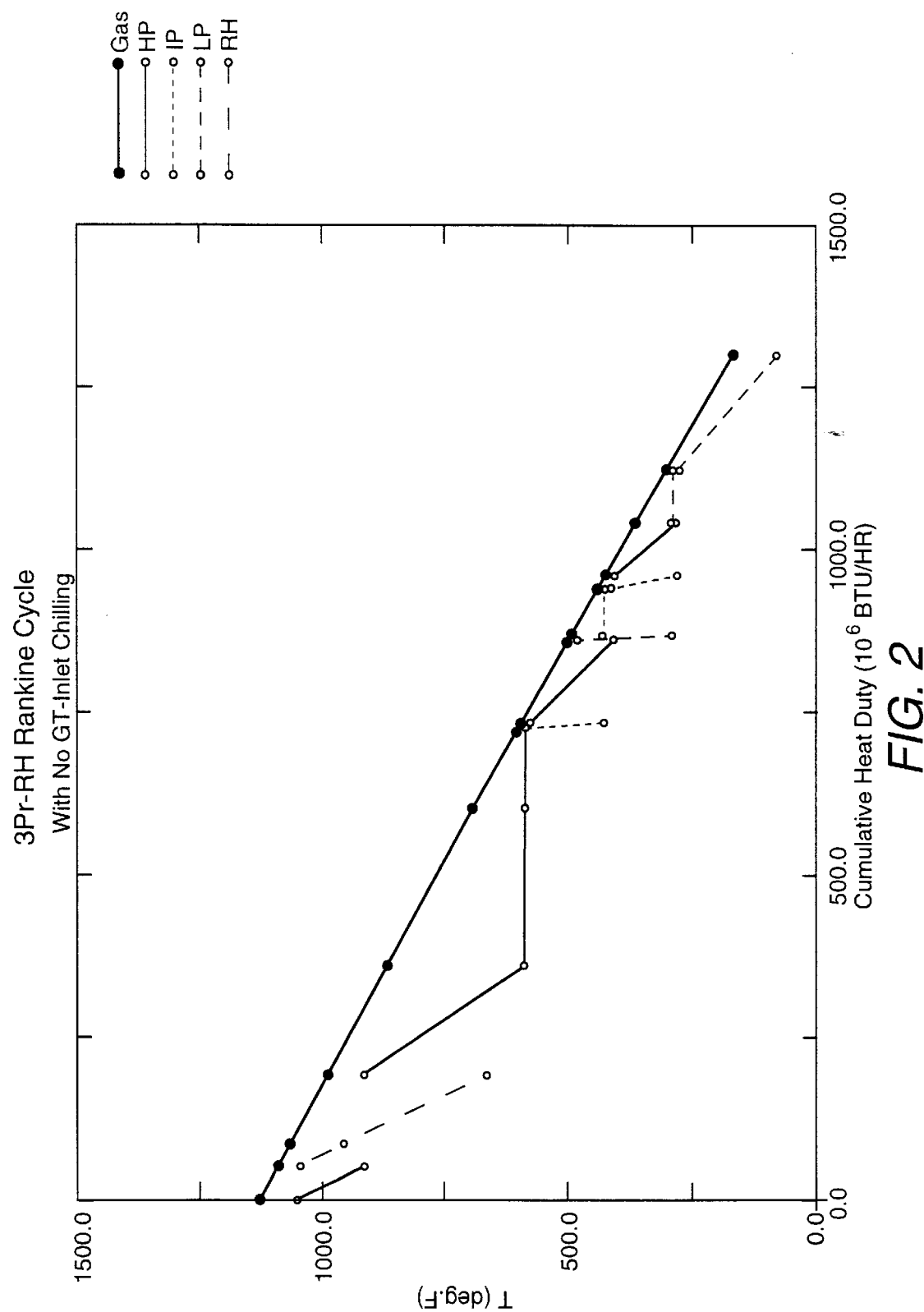
FIG. 2 is a graph showing the relationship of temperature in degrees Fahrenheit to cumulative heat duty in millions of BTU's per hour for a typical reheat bottoming cycle design, again without the benefit of the heat recovery achieved with the process modifications in accordance with the present invention.

As indicated above, one problem with the conventional design of combined gas and steam turbine cycles such as that shown in FIG. 1 is that the overall efficiency of the gas turbine begins to decrease as the ambient air temperature feed to the turbine reaches a level of about 60° F. In that regard, FIG. 2 shows a thermal curve of the temperature and heat duty for a typical combined cycle plant using a "Rankine cycle" at the rating point of the plant, but without benefit of the inlet air chiller in accordance with the present invention. FIG. 2 includes a plot of the heat duty in millions of BTU's hour versus the corresponding temperature of the gas turbine exhaust and temperatures of the high, intermediate and low pressure feeds to the steam turbine. The portion of FIG. 2 to the far right of the chart represents the cumulative heat duty resulting from reheating the liquid condensate before it enters the low pressure evaporator "LP." The present invention modifies this "low pressure economizer" section of the HRSG.

As an illustration, the combustion gas temperature in the economizer section of the HRSG normally ranges between 300° F. to 310° F. The gasses leaving the HRSG enter the stack through line 40 on FIG. 1 at a temperature of approximately 185° F. The recycle condensate flows counter-current to the gas flow and enters the HRSG at about 85° F. (see point 41 on FIG. 1). The reheated working vapor leaves the HRSG at about 285° F. (line 30 in FIG. 1). In this example, the temperature differential of 25 degrees at the gas inlet as compared to 100 degrees at the gas exit creates a mismatch in thermal characteristics of the two streams. The modification to the bottoming cycle proposed by the present invention improves the efficiency of the HRSG and overall power rating of the combined cycle by utilizing a portion of this remaining waste heat in the "economizer" section in combination with a separate, multi-component working fluid.

Figure 3:
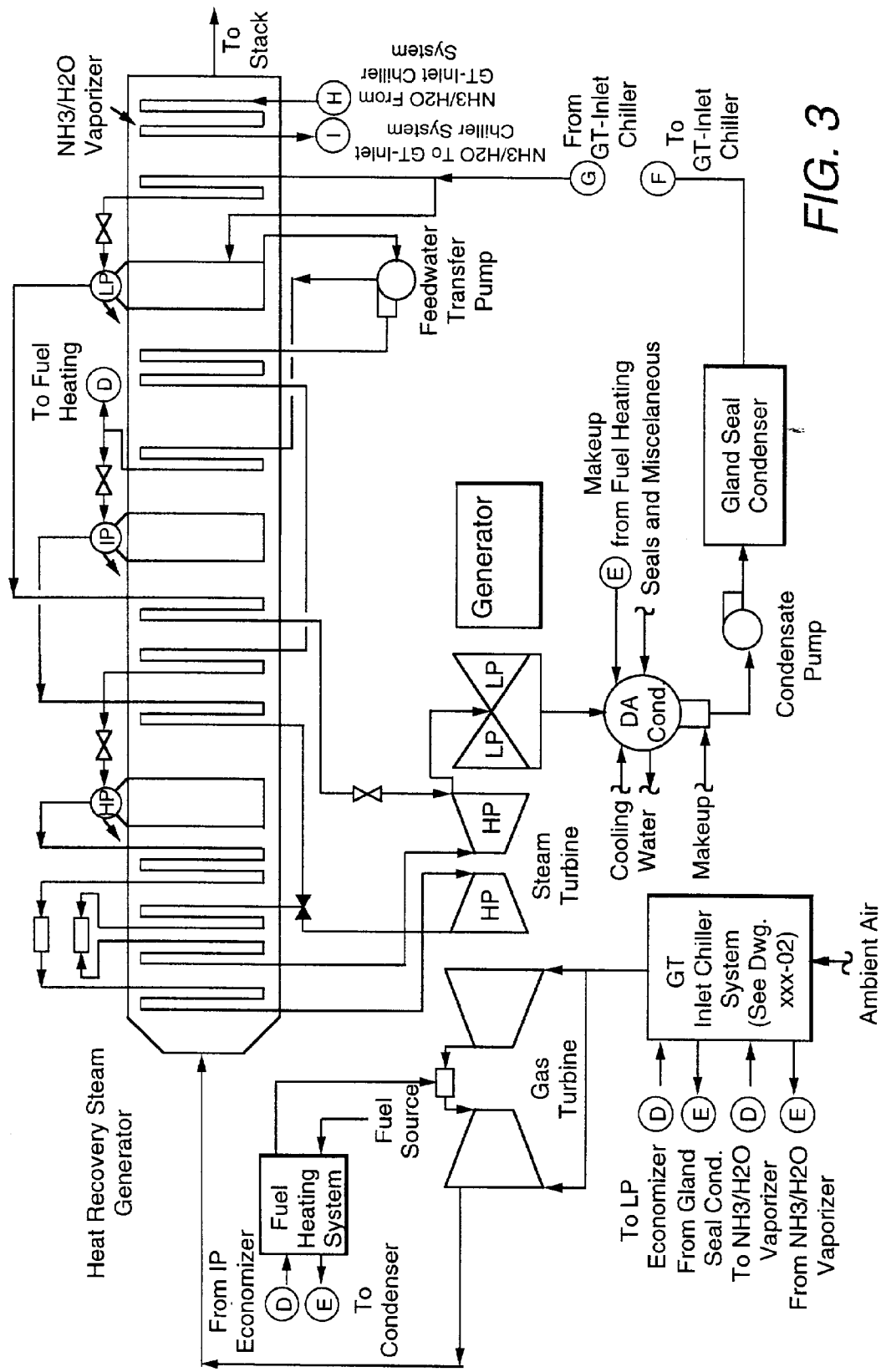
FIG. 3 is a process flow diagram depicting the same bottoming cycle and HRSG shown in FIG. 1 but with the inclusion of an inlet air chiller in accordance with the present invention as part of the low pressure section of the bottoming cycle.

The bottoming cycle modification proposed by the present invention is shown in FIG. 3. A portion of the low pressure economizer section of the HRSG has been modified by introducing a separate multi-component working fluid cycle into the HRSG at location "H." In the preferred embodiment, this additional portion of the HRSG, captioned "$NH_3/H_2O$ vaporizer" on FIG. 3, uses a mixture of ammonia and water from a "chiller" subsystem located outside the HRSG and depicted in greater detail in FIG. 4. The HRSG heats the ammonia-water feed and returns ammonia-water vapor to the inlet of the chiller subsystem (see line "I" and FIG. 4).

As FIG. 3 illustrates, the ammonia-water mixture flows counter-current to the combustion gases in the HRSG. Thus, as the ammonia-water mixture begins to boil, the partially vaporized mixture of vapor and liquid exit the HRSG at point "I" and returns to the chiller subsystem. After leaving the HRSG, the two-phase mixture feeds into a vapor-liquid separator 50 in the chiller subsystem (see FIG. 4), where the ammonia-rich vapor (line 51) separates from the water-rich liquid (line 52) off the bottom of liquid separator 50. The enriched vapor 53 from the top of separator 50 is cooled and partially condenses in a condenser (identified as the "E-103 economizer" on FIG. 4) which uses cooling water from location "F" on FIG. 3 (the condensate from the gland seal condenser) as the heat transfer medium. The condensate simultaneously becomes heated in the "economizer" E-103 before returning to the HRSG at point "G" on FIG. 3. The HRSG then further heats the condensate prior to entering the low pressure boiler as described above.

Figure 4:
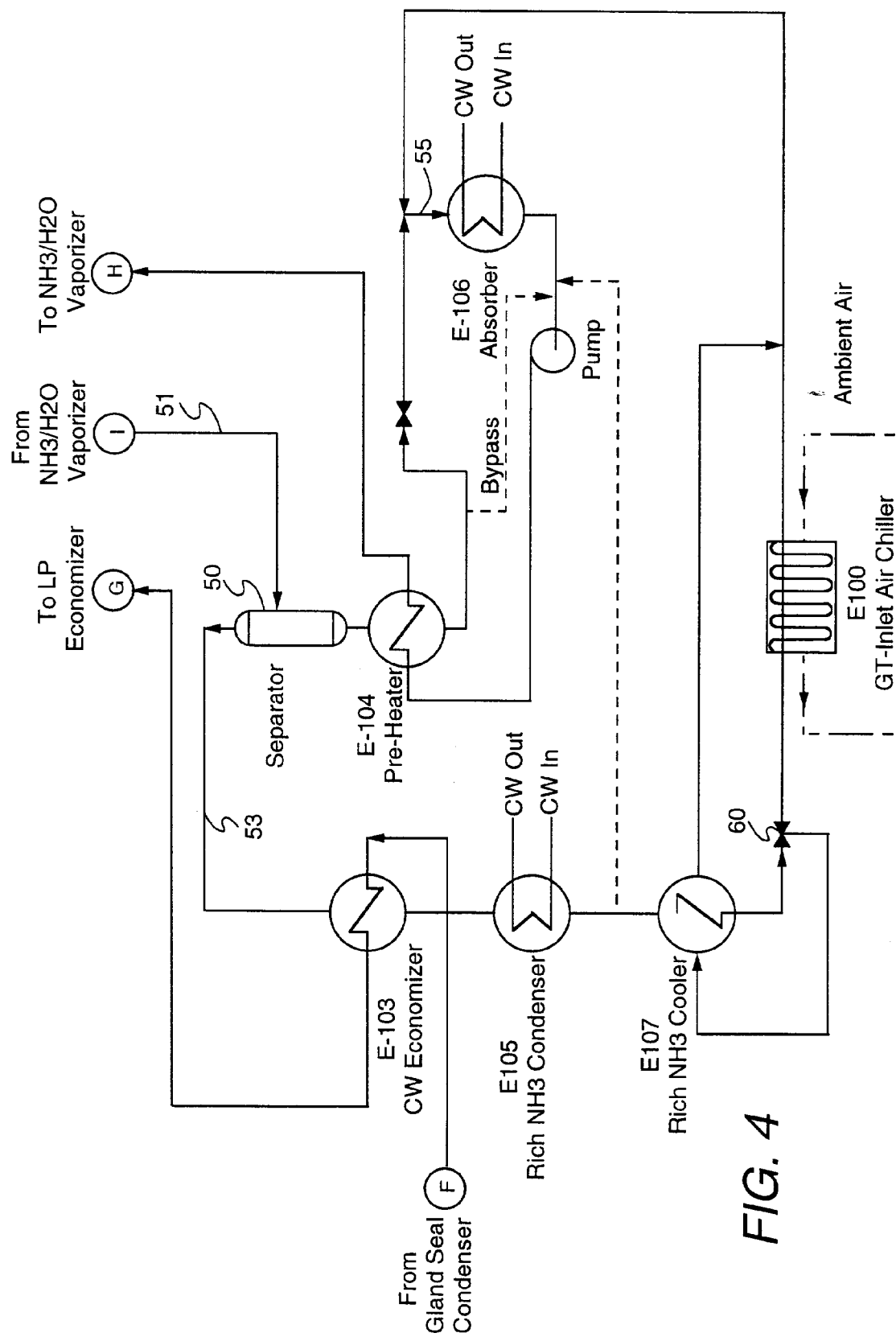
FIG. 4 is a process flow diagram depicting the flow pattern for an exemplary inlet air chiller system in accordance with the invention.

The enriched vapor from separator 50 completely condenses in condenser "E-105." In the embodiment shown in FIG. 4, the ammonia-rich liquid is also sub-cooled in heat exchanger "E-107" prior to flashing at a lower pressure across valve 60. As those skilled in the art will appreciate, the specific amount of refrigeration occurring during this sub-cooling stage depends on the relative compositions of the components in the binary working fluid during the sub-cooling and flashing. In any case, the sub-cooled, enriched mixture flows countercurrent to the air at ambient temperature in air-inlet chiller "E-100," thereby reducing the temperature of the air feed to gas turbine 10. The evaporated "refrigerant" is then absorbed in the water-rich liquid exiting from separator 50 (line 55) and the mixture feeds into absorber "E-106" where the heat of absorption is removed using cooling water. Finally, the pressure of the liquid from absorber E-106 is increased using pump 70 and then heated in pre-heater "E-104" using the liquid fraction from separator 50 as the heat exchange medium. The fluid from E-104 returns to the HRSG at point "H" on FIG. 3.

As a direct result of the modifications to the HRSG as described above and shown in FIGS. 3 and 4, the ambient air temperature feed to the gas turbine can be reduced significantly. In addition, an effective amount of cooling can be achieved by the chiller subsystem with significantly lower energy requirements as compared to a conventional refrigeration cycle for the inlet air to the gas turbine. Thus, the overall rated efficiency of the combined cycle tends to increase by using the new chiller design.

Figure 5:
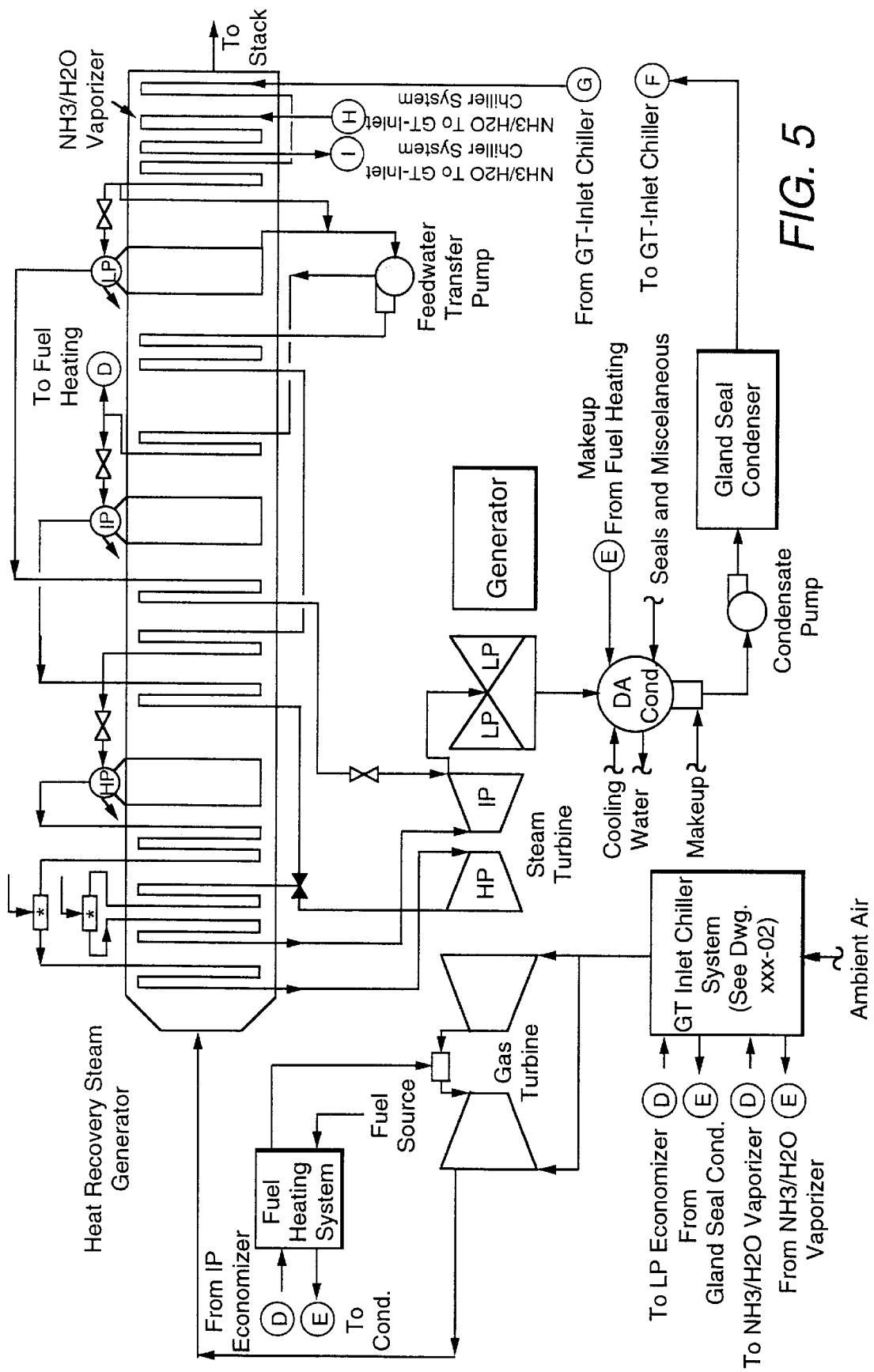
FIG. 5 is a process flow diagram showing a second embodiment of the reheat bottoming cycle with a second embodiment of the air inlet chiller in accordance with the invention.

Although the preferred embodiment of the invention uses a chiller having a mixture of ammonia and water as the working fluid, other multi-component fluids, including hydrocarbons and/or freons, can be used to accomplish the same cooling effect of the inlet gas turbine air and resulting increase in efficiency of the combined cycle. A variation of the above preferred exemplary embodiment of the invention appears in FIG. 5. In this second embodiment, the ammonia-water vaporizer (designated by the letters "H" and "I") is positioned between sections of the low pressure economizer (as opposed to being placed at the very end of the HRSG economizer section as shown in FIG. 4). Alternatively, the NH3/H2O vaporizer section could be placed in parallel with the low pressure economiser.

The following example illustrates the net-improved efficiency resulting from a modified bottoming cycle having a chiller design in accordance with the present invention. The system uses ammonia/water with thermal properties for a typical hot day (90 F. and 35% relative humidity) and typical operating conditions as follows: Starting with a 50% by weight ammonia liquid at "H" (180 psia, 156.50 F.), the mixture is boiled in the HRSG and returns with roughly 25% vapor at 170 psia and 170° F. The vapor from the separator (96% ammonia) is condensed to a liquid at 87° F. releasing part of the heat to economize water from "F" at 283 psia and 105° F., with the remaining heat being transferred to the cooling water at 75° F. The condensed liquid is then subcooled in heat exchanger "E-107" to 49° F. and the downstream valve flashes it from 195 psia to 60 psia, providing a refrigerant at 38° F. Approximately 8% of this refrigerant is used for sub-cooling in "E-107," with the remainder going to the inlet chiller where the inlet air feed to the gas turbine is cooled down to 56° F. Refrigerant vapors at 62.6 psia and 70° F. are mixed with 35% ammonia liquid at 102° F. in the absorber to again create a 50% ammonia-water liquid mixture at 60 psia and 85° F. The ammonia liquid mixture is then pumped to 185 psia and heated to 156.5° F. using the 35% ammonia liquid from the separator to complete the chiller subsystem cycle.

The above modifications to a conventional combined cycle result in a net increase of power output after subtracting the power used by the liquid pump (approximately 9%) without any decrease in plant efficiency. The increase in power output without an appreciable heat rate penalty represents a significant improvement over the use of conventional mechanical refrigeration to accomplish the same cooling load. In addition, unlike a normal absorption refrigeration cycle requiring a separate source of high temperature heat, the proposed chiller subsystem "borrows" heat from the exhaust gases associated with the low pressure economizer only to return it to do the "economizing" of the feed water outside the HRSG in the chiller subsystem.

Several variations of the basic concept can be used with the same beneficial results. For example, it has been found that multiple mixture boiling sections and multiple pressure stages can be used in the chiller and the absorber. Cooling water heat exchangers E-105 and 106 can also be placed in series rather than in parallel. The chiller subsystem could even be bypassed when not needed without affecting the economizing function available at other times (e.g., the hot summer months) when the ambient air temperature to the gas turbine remains low.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for cooling the inlet air to a gas turbine combined cycle plant having a heat recovery steam generator ("HRSG") as part of a bottoming cycle, whereby said inlet air is at ambient temperature before cooling, said method comprising:

(a) initially heating a multi-component working fluid consisting of higher and lower boiling components by exposing said multi-component working fluid to a portion of a waste heat from the gas turbine exhaust;

(b) evaporating part of said working fluid to generate an enriched vapor fraction that is enriched with the lower boiling point component relative to said working fluid;

(c) separating said enriched vapor fraction from said working fluid in a vapor-liquid separator and condensing the vapor into an enriched liquid;

(d) subcooling a portion of said enriched liquid by reducing the pressure of said enriched liquid; and (e) cooling said inlet air to said gas turbine through heat exchange with said portion of said subcooled and enriched liquid.

2. The method according to claim 1, wherein said multi-component working fluid comprises a mixture of ammonia and water.

3. The method according to claim 1, wherein said step of initially heating said multi-component working fluid takes place in the low pressure section of said HRSG.

4. The method according to claim 1, wherein said steps of evaporating, separating and subcooling take place in a separate subsystem from said HRSG without further exposure to any gas turbine combustion gasses.

5. The method according to claim 1, wherein said step of initially heating said multi-component working fluid takes place between selected portions of said low pressure section of said HRSG.

6. The method according to claim 1 further comprising the steps of vaporizing a portion of said subcooled liquid, absorbing said vaporized portion in water and returning the absorbed mixture to the low pressure section of said HRSG.

7. A bottoming cycle for a gas turbine combined cycle, comprising:

(a) an air chiller external to said bottoming cycle comprising one or more vaporizers, one or more separators, and one or more subcoolers for treating a multi-component working fluid that is then used in direct heat exchange with an air inlet; and (b) an evaporator disposed inside a heat recovery steam generator bottoming cycle for heating said multi-component working fluid by exposure to a portion of gas turbine combustion gases.

8. The bottoming cycle according to claim 7, wherein said multi-component working fluid comprises a mixture of ammonia and water.

9. The bottoming cycle according to claim 7, wherein said vaporizer includes the evaporator disposed inside said bottoming cycle for generating an enriched vapor fraction from said multi-component working fluid.

10. The bottoming cycle according to claim 7, further comprising a vapor-liquid separator for separating an enriched vapor fraction from said multi-component working fluid, a condenser for condensing the enriched vapor into an enriched liquid, a subcooler for said enriched liquid, and heat exchange means for cooling said air inlet using said subcooled and enriched liquid.

* * * * *